W. R. MAXVILLE.
COMBINED COTTON CHOPPER AND CULTIVATOR.
APPLICATION FILED SEPT. 7, 1918.
1,316,316.
Patented Sept. 16, 1919.
2 SHEETS—SHEET 1.
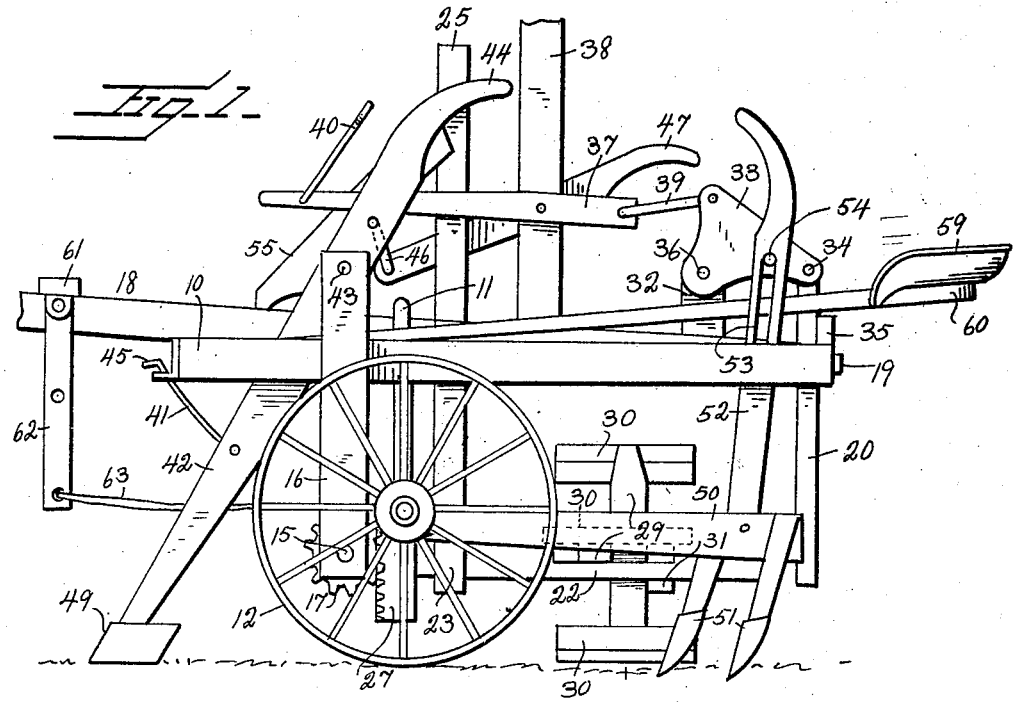
Inventor
W. R. Maxville
By Watson E. Coleman
Attorney

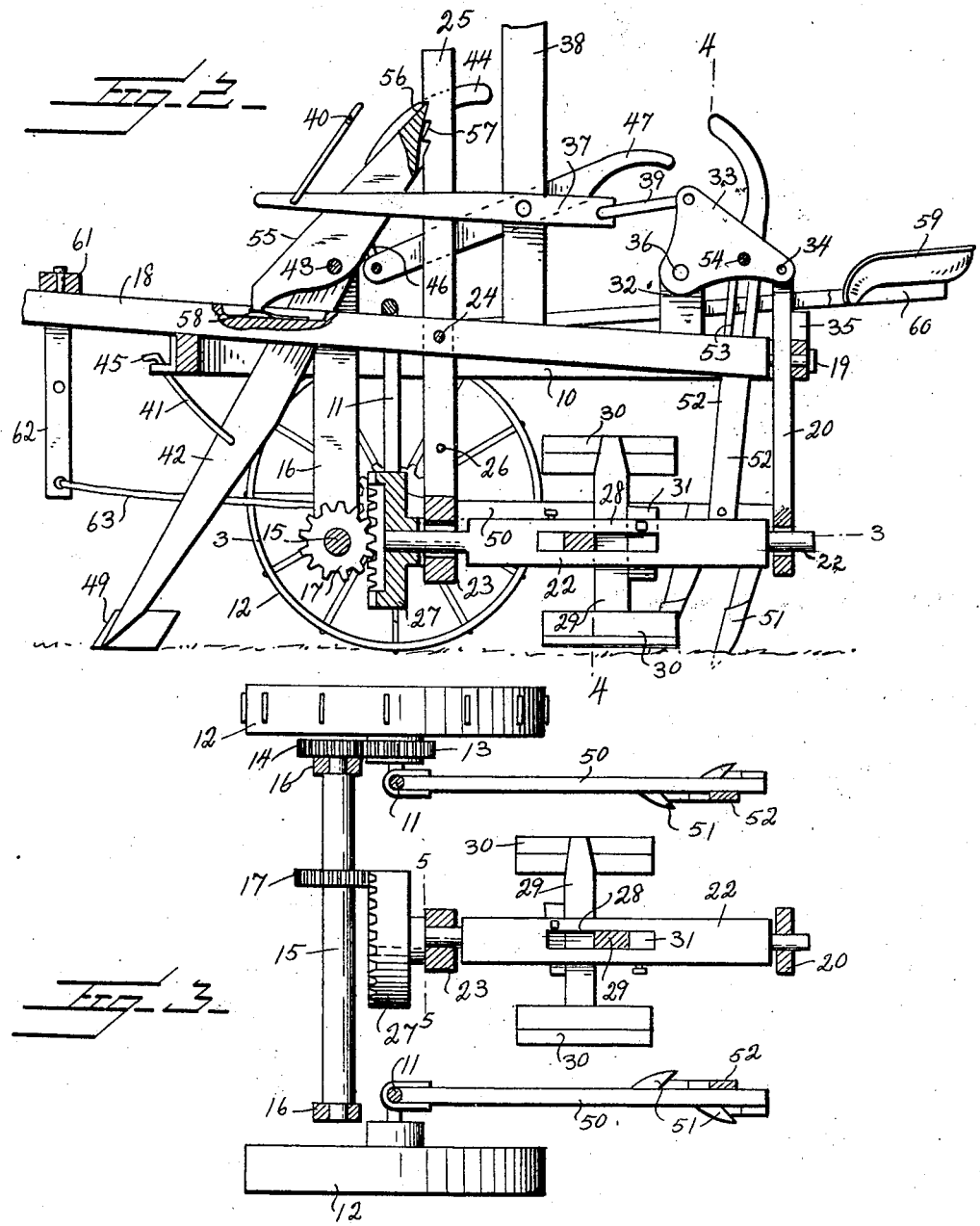

UNITED STATES PATENT OFFICE.

WILLIAM R. MAXVILLE, OF VENDOR, ARKANSAS.

COMBINED COTTON CHOPPER AND CULTIVATOR.

1,316,316.  Specification of Letters Patent.  Patented Sept. 16, 1919.

Application filed September 7, 1918. Serial No. 253,058.

*To all whom it may concern:*

Be it known that I, WILLIAM R. MAXVILLE, a citizen of the United States, residing at Vendor, in the county of Newton and State of Arkansas, have invented certain new and useful Improvements in Combined Cotton Choppers and Cultivators, of which the following is a specification, reference being had to the accompanying drawings.

This invention relates to agricultural implements, and particularly to cotton choppers.

The general object of my invention is the provision of a combined cultivator and cotton chopper so constructed that the cultivators may be used without using the cotton chopper or vice versa.

A further object is the provision in connection with the cotton chopper, of scrapers mounted forward of the cotton chopper and adapted to be raised or lowered independently of the action of the chopper.

Still another object is to provide improved means for mounting a rotary cotton chopper upon the frame of the machine, the means being such that the chopper may be readily lowered or raised into or out of operative position, means being provided whereby the chopper supporting shaft may be readily shifted into or out of engagement with the driving shaft.

Other objects will appear in the course of the following description.

My invention is illustrated in the accompanying drawings, wherein:—

Figure 1 is a side elevation of a cotton chopper and cultivator constructed in accordance with my invention;

Fig. 2 is a longitudinal vertical sectional view thereof;

Fig. 3 is a fragmentary top plan view thereof, partly in section;

Fig. 4 is a vertical section on the line 4—4 of Fig. 2;

Fig. 5 is a sectional view on the line 5—5 of Fig. 3; and

Fig. 6 is a perspective view of the yoke 46.

Referring to these drawings, it will be seen that my machine comprises a main frame 10, which is approximately rectangular in cross section, and is supported by means of an arch 11 upon the traction wheels 12, which may be of any suitable or ordinary form. One of these traction wheels carries upon it a gear wheel 13 meshing with a gear wheel 14 mounted upon a transversely extending shaft 15 supported in depending brackets 16 from the frame. The transverse shaft 15 carries upon it a second gear wheel 17.

Mounted upon the supporting frame is a tongue 18, which extends over the front cross bar of the supporting frame and is attached thereto and extends rearward at an angle and carries at its end a bolt 19 which extends through the rear cross bar, the rear end of the tongue 18 being spaced from the cross bar. Slidingly disposed upon this bolt 19 is a vertical chopper shaft supporting bar 20, which is vertically slotted, as at 21, for the passage of the bolt 19 and which, at its lower end, carries a bearing for the chopper shaft 22. The forward end of this shaft is rotatably mounted in a shipper yoke 23 which is attached to and forms part of a shipper lever 25, which is pivoted to the tongue at 24. It will thus be seen that the shaft 22 may be shifted longitudinally and that it also has a rocking movement upon the pivot 24. The forward end of the shaft 22 carries upon it the relatively large crown gear wheel 27, whose teeth mesh with the teeth of the gear wheel 17, and thus motion is communicated from the drive shaft 15 to the chopper shaft 22.

The chopper shaft 22 is provided with a plurality of longitudinally extending slots 28 in which are disposed cross bars 29 carrying at their ends the chopping blades 30, these blades being slightly curved from their inner to their outer edges. The cross bars 29 may be held in adjusted positions in the slots 28 by means of wedges or blocks 31 disposed in said slots. Any other suitable means may be used for holding the bars 29 in adjusted positions.

The lever 25 is for the purpose of shifting the shaft 22 longitudinally so as to carry the gear wheel 27 into or out of mesh with the gear wheel 17, and for the purpose of raising or lowering the shaft support 20 to thereby carry the cotton choppers into or out of operative position, I mount upon a bracket 32 the bell crank levers 33, whose rear ends embrace a reduced portion of the supporting member 20 and are pivoted thereto by a transverse pin 34. This member 20 is provided with a transverse cross bar 35, which acts as a stop by engaging the rear cross bar of the frame when the cotton chopper is lowered. The bell crank levers are rocked upon the pivot pin 36 by means of a lever 37 which is pivoted upon a standard 38 and connected by a link 39 to the forward ends of the bell crank levers 33. The lever 37 carries at its end the swinging handle 40, whereby the lever may be readily manipulated.

Mounted upon downwardly depending hangers 41 from the forward cross bar of the frame, are the downwardly and forwardly extending scraper carrying members 42 which, at their upper ends, are pivoted upon a transverse bolt or pin 43 extending through the brackets 16 and which, at their upper ends, are formed with handles 44, whereby the scraper supports may be adjusted. The hangers 41 slide through the forward cross bar of the frame and are angularly bent at their upper ends, as at 45, to limit the downward movement of the scraper supporting bars. These scraper supporting bars are connected by means of a transverse crank-shaped yoke 46, which is connected to an adjusting lever 47 pivoted upon the standard 38. The lower end of the supporting bars 42 carry the scrapers 49, whose paths of motion are on each side of the row of cotton which is to be chopped out.

Swingingly connected to the arch 11, in line with the axes of the traction wheels 12, are the cutivator beams 50 which, at their rear ends, carries the cutivators 51, these cultivators being disposed on each side of the path of travel of the cotton chopper. Pivotally connected to each of the beams 50 is an upwardly extending member 52 which is longitudinally slotted, as at 53. A transversely extending pin 54 extends through the bell crank levers 33 and through the slots 53. It will be obvious, therefore, that the chopping shaft 22 may be adjusted independently of these members 52 and that the members 52 and the beams 50 may be raised or lowered independently of the cotton chopping shaft.

For the purpose of holding the lever 25 in adjusted position and thus holding the gearing of the cotton chopper into or out of operative position, I mount upon the transverse pin 43, a pawl 55, as it may be termed, which at its upper end, is provided with a tooth 56 engageable with notches 57 on the lever 25. The yoke 46 is cranked in order to pass beneath the locking pawl 55. The locking pawl is shiftably mounted upon the pin 43, but when it is above the tongue 18, the lower extremity of the locking pawl bears against the tongue, as at 58.

The seat 59 is mounted upon resilient bars 60 attached to the side bars of the frame 10 extending upward and rearward therefrom. For the purpose of applying draft to the machine, I mount a whiffletree 61 upon the tongue 18 and swingingly support from its ends the evener bars 62, each of which is perforated at its middle for the attachment of a clevis, the lower end of each evener bar being connected by a flexible strap 63 to the arch 11.

With a machine constructed in accordance with my invention, it is obvious that cultivation of the cotton can be carried on at the same time as the cotton chopping. It will also be obvious that the operator can at any time raise the chopper without affecting either the cultivator or the scraping blades, or raise the cultivator blades or the scraping blades without shifting the chopper. Thus, the machine may be used either as a combined cultivator and cotton chopper, or as a cultivator alone.

I claim :—

1. A machine of the character described comprising a supporting frame, traction wheels mounted thereon, a drive shaft operatively connected to said traction wheels to be driven thereby and having a gear wheel thereon, a longitudinally extending chopper supporting shaft mounted for longitudinal movement, a gear wheel on the chopper supporting shaft engageable with the gear wheel on the drive shaft, a chopper lever mounted on the frame and carrying a bearing supporting the forward end of the chopper shaft, said lever being shiftable longitudinally to carry the chopper shaft into or out of engagement with the drive shaft and said lever supporting the forward end of the chopper shaft to permit vertical oscillation of the rear end of the chopper shaft, a vertically movable member supporting the rear end of the chopper shaft and permitting longitudinal movement thereof and having a stop limiting the downward movement of the chopper shaft, and a manually operable lever for raising or lowering said member to thereby raise or lower the rear end of the chopper shaft.

2. A machine of the character described comprising a rectangular supporting frame, a tongue extending longitudinally the full length of the frame, traction wheels operatively supported on the frame, a drive shaft operatively connected to the traction wheels to be driven thereby and having a gear wheel thereon, a lever pivoted to the tongue and extending above and below the tongue, and having a loose bearing at its forward end, a chopper supporting shaft mounted at its forward end in said bearing in the lever and carrying a gear wheel, the lever being shiftable to shift the chopper supporting shaft vertically to carry the gear wheels into or out of mesh, a vertically disposed member constituting a bearing for the rear end of the chopper supporting shaft and vertically slotted to embrace the rear end of the tongue and slide thereon, a stop mounted upon said member and limiting the downward movement of the member, and a lever operatively connected to said member whereby it may be raised or lowered.

3. A machine of the character described comprising a supporting frame including a longitudinally extending tongue extending the full length of the supporting frame, traction wheels mounted on the frame, a drive shaft operatively connected to the traction wheels and carrying a gear wheel, a lever pivotally mounted on the tongue extending downward rearward of the drive shaft and having a bearing, a longitudinally extending chopper shaft mounted in said bearing for vertical oscillation or rotation and carrying a gear wheel at its forward end engageable with the driving gear wheel, a vertical member having a slot embracing the rear end of the tongue and forming a bearing for the rear end of the chopper shaft and having a stop engaging with the frame to limit the downward movement of said member and the chopper shaft, a support on the tongue forward of said member, bell cranks mounted upon said bearing and operatively connected to the member, a lever operatively connected to the bell cranks to shift them to thereby raise or lower the member, cultivator beams pivotally supported at their forward ends and extending rearward on each side of the chopper shaft, pivoted members extending upward from the cultivator beams and longitudinally slotted adjacent their upper ends, the upper ends of said members being formed to provide handles, and a transverse pin passing through the rear ends of the bell crank levers and engaging through said slots whereby the cultivator beams will be raised when the chopper shaft is raised, but said cultivator beams may move freely upward independently of the chopper shaft.

In testimony whereof I hereunto affix my signature in the presence of two witnesses.

WILLIAM $\overset{\text{his}}{\times}$ R. MAXVILLE.
mark

Witnesses:
 Jas. T. Greenhaw,
 Lum Hefley.

Copies of this patent may be obtained for five cents each, by addressing the "Commissioner of Patents, Washington, D. C."